United States Patent
Barany et al.

(10) Patent No.: US 6,434,140 B1
(45) Date of Patent: Aug. 13, 2002

(54) SYSTEM AND METHOD FOR IMPLEMENTING XOIP OVER ANSI-136-A CIRCUIT/SWITCHED/PACKET-SWITCHED MOBILE COMMUNICATIONS NETWORKS

(75) Inventors: Peter Barany, McKinney; Jayshree Bharatia, Plano, both of TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/415,907

(22) Filed: Oct. 8, 1999

Related U.S. Application Data (60) Provisional application No. 60/110,972, filed on Dec. 4, 1998.

(51) Int. Cl.⁷ .................................................. H04L 12/66
(52) U.S. Cl. ...................... 370/352; 370/401; 370/410; 370/466
(58) Field of Search ................................. 370/352, 356, 370/338, 466, 467, 328, 329, 335, 336, 337, 342, 343, 345, 349, 401, 410

(56) References Cited

U.S. PATENT DOCUMENTS

| | | | |
|---|---|---|---|
| 5,742,905 A | | 4/1998 | Pepe et al. .................. 455/461 |
| 5,978,368 A | * | 11/1999 | Hjelm et al. ................. 370/347 |
| 5,978,386 A | * | 11/1999 | Hamalaien et al. .......... 370/466 |
| 6,011,842 A | * | 1/2000 | Brivet et al. ................. 370/207 |
| 6,016,318 A | * | 1/2000 | Tomoike ...................... 370/401 |
| 6,088,328 A | * | 1/2000 | McKnight .................... 370/216 |
| 6,026,086 A | * | 2/2000 | Lancelcot et al. ........... 370/353 |
| 6,075,783 A | * | 6/2000 | Voit .............................. 370/352 |
| 6,130,883 A | * | 10/2000 | Spear et al. ................. 370/328 |
| 6,134,235 A | * | 10/2000 | Goldman et al. ............ 370/352 |

FOREIGN PATENT DOCUMENTS

| WO | WO97/16007 | 5/1997 | ........... H04L/12/66 |
|---|---|---|---|
| WO | WO98/19438 | 5/1998 | ........... H04M/3/50 |
| WO | WO98/44701 | 10/1998 | ........... H04M/3/00 |

* cited by examiner

*Primary Examiner*—Melvin Marcelo
*Assistant Examiner*—Soon-Dong Hyun
(74) *Attorney, Agent, or Firm*—John D. Crane; Bracewell & Patterson, L.L.P.

(57) ABSTRACT

The SS7 interface of a conventional GPRS-136 or GPRS-136HS network is replaced with an IP interface. An IP interface is placed between the ANSI TIA/EIA-41 circuit-switched network and the GPRS-136 packet-switched network. This interface can handle both signaling and bearer traffic and thereby overcomes the limitations imposed by the current SS7 interface, which can handle only signaling.

14 Claims, 5 Drawing Sheets

SYSTEM AND METHOD FOR IMPLEMENTING XOIP OVER ANSI-136-A CIRCUIT/SWITCHED/PACKET-SWITCHED MOBILE COMMUNICATIONS NETWORKS

CROSS REFERENCE TO RELATED APPLICATION

This application claims priority from Provisional Application No. 60/110,972, filed Dec. 04, 1998, which is hereby incorporated by reference.

BACKGROUND OF THE INVENTION

1. Technical Field

The present invention generally relates to improved mobile telecommunications systems and in particular to improved packet-switched wireless/wired communication systems. Still more particularly, the present invention relates to an improved packet-switched telecommunications system which utilizes Internet Protocol packet communications.

2. Description of the Related Art

The written description utilizes a large number of acronyms to refer to components, methods and services. Although these acronyms, and the corresponding protocols and technologies, are known to those of skill in the art, for purposes of this discussion and convenience for the reader, acronyms will be defined as follows:

AMPS Advanced Mobile Phone Service. TIA analog cellular, and all standards that retain compatibility with it (NAMPS, D-AMPS, CDMA)
ANSI American National Standards Institute.
BSS Base Station System
DCCH Digital Control Channel. The control channel used by IS-136 and TIA/EIA-136 D-AMPS systems.
DTC Digital Traffic Channel
DMS Digital Multiplex Switch
EIA Electronics Industry Association
Gateway MSC An MSC designed to provide a gateway between a TIA/EIA-136/ANSI-41 network and a GPRS-136 network.
GGSN Gateway GPRS Support Node
GPRS Generalized Packet Radio Service. A GSM-based packet data protocol.
GSM Global System for Mobile Communications.
GTP GPRS Tunnelling Protocol
IMT International Mobile Telecommunications
ISUP ISDN User Part. SS7 signaling between switches.
MDIS Mobile Data Interface System
MGCP Media Gateway Control Protocol
MSC Mobile Switching Center
MSC-G Gateway MSC.
MSC-H Home MSC.
MSC-O Originating MSC.
MSC-V Visited MSC. The MSC in which a mobile is currently registered.
PDN Public Data Network
POTS Plain Old Telephone Service
PSTN Public Switched Telephone Network
Protocol A specification of the messages used to communicate over one or more interfaces.
RTP Real-Time Transport Protocol
SCP Signal Control Point
SGSN Serving GPRS Support Node
STP Signal Transfer Point
SS7 Signaling System Number 7
TDMA Time Division Multiple Access. A modulation technique used, e.g., by GSM.
TIA Telecommunications Industry Association TIA/EIA-136 TDMA air interface standard. Replaces IS-136.
XoIP Communications via Internet Protocol, where X can represent voice, data, video, etc.

In the current version of the ANSI TIA/EIA-136 and ANSI TIA/EIA-41 standards, the Digital Control CHannel (DCCH) and Digital Traffic Channel (DTC) support speech, asynchronous circuit-switched data, and G3 Fax services.

All three of these services are circuit-switched oriented. Revisions are now being made to the ANSI TIA/EIA-136 standard to produce ANSI TIA/EIA-136-A and ANSI TIA/EIA-136-B. ANSI TIA/EIA-136-A will specify a packet-switched data service known as "136+" or GPRS-136. ANSI TIA/EIA-136-B will specify a high-speed packet-switched service known as "136HS" or GPRS-136HS. The core technology for both of these packet-switched services is based on GPRS and EGPRS, respectively. These are ETSI GSM standards.

Figure 1:
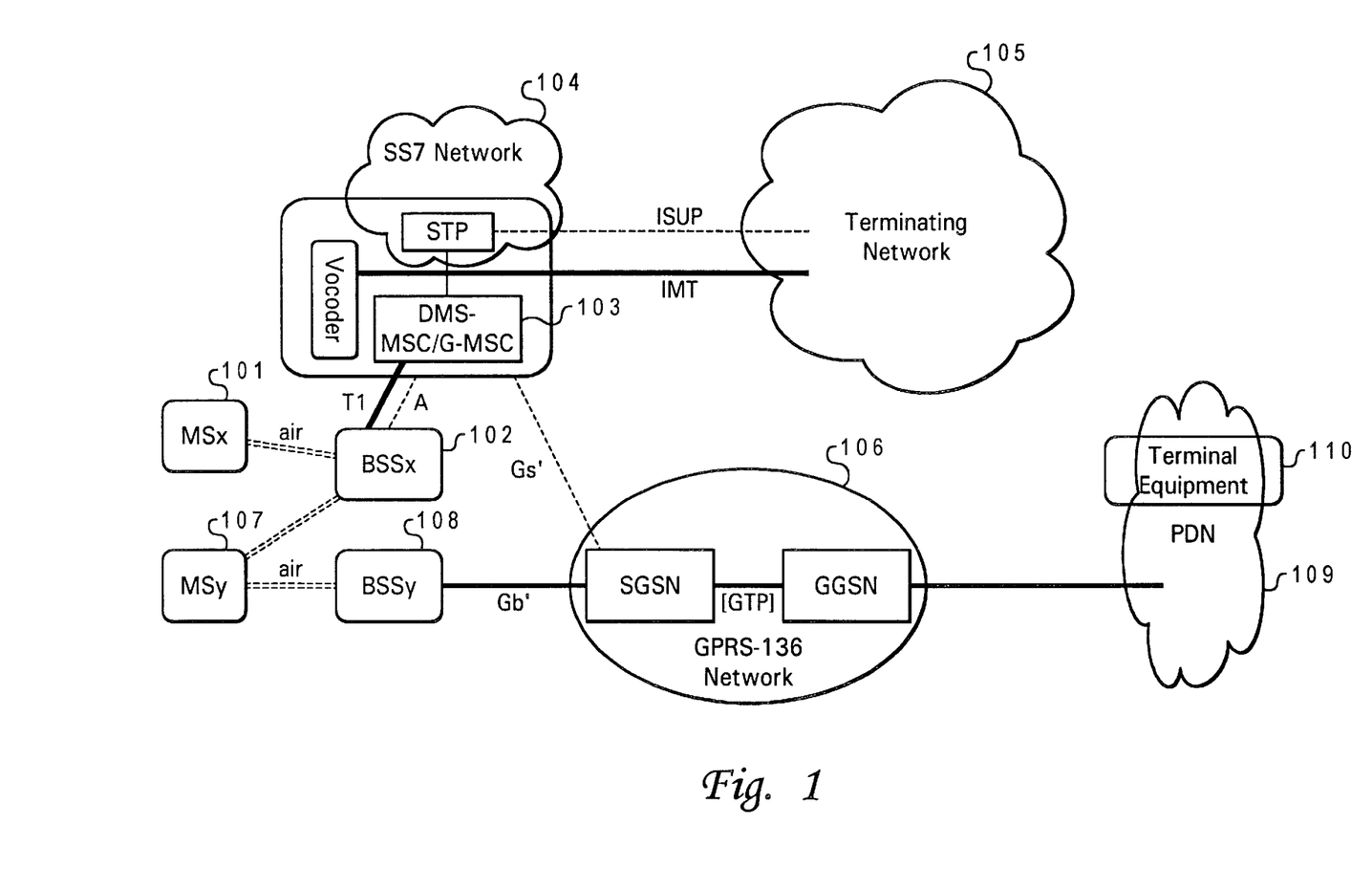
FIG. 1 depicts a conventional GPRS network.

FIG. 1 shows a conventional GPRS-136-based network where voice and circuit-switched data is-still supported by the circuit switched network 103/104 but packet-switched data is supported by the GPRS-136 packet data network 106. Gateway MSC (G-MSC) 103 is a new functional entity standardized for GPRS-136, which is an MSC having the capability to provide a gateway to GPRS-136 network. Hence, G-MSC can be viewed as a part of MSC or a separate network Node. If it is considered a separate node, the SS7 'E' interface is used to exchange signaling messages with MSC.

In FIG. 1, a mobile station MSx 101, which incorporates a vocoder and handles voice or circuit-switched data calls, communicates over the air with a BSSx switch 102, which supports voice and/or circuit switched data. The BSSx 102 communicates via both a T1 bearer traffic interface and a signaling interface A with a gateway mobile switching center 103. The SS7 network 104 is connected, in turn, with a terminating network 105 and a GPRS-136 network 106. Note that connection Gs', between the SS7 network 104 and the GPRS-136 network 106, is a signaling interface only.

A GPRS-136 mobile station MSy 107, also incorporating a vocoder and configured to support voice and/or packet-switched data, communicates over the air with a BSSy switch 108, which supports packet data. The BSSy 108 communicates over a bearer traffic interface Gb' with the GPRS-136 network 106. For voice calls, the vocoder of MSy 107 communicates with the BSSx switch 102, as described above.

GPRS-136 network 106 is connected to Public Data Network (PDN) 109. The PDN includes any destination terminal equipment 110.

TDMA service operators have expressed a desire to implement XoIP over the GPRS-136 network (where X can represent voice, data, video, etc., e.g., VoIP). XoIP can be implemented over the circuit-switched or packet-switched air interface. However, the current interface Gs' to the GPRS-136 packet-switched network is standardized for signaling only and is implemented via SS7. Therefore, if the circuit-switched air interface is to be used, this is a problem, because XoIP involves the transmission of both signaling and bearer traffic. Therefore, the SS7 interface is inappropriate and an XoIP solution utilizing the GPRS-136 network would be greatly desired.

SUMMARY OF THE INVENTION

It is therefore one object of the present invention to provide an improved mobile telecommunications system.

It is another object of the present invention to provide an improved packet-switched mobile telecommunications system.

It is yet another object of the present invention to provide an improved packet-switched telecommunications system which utilizes Internet Protocol packet communications.

The foregoing objects are achieved as is now described. According to the preferred embodiment of the invention, the SS7 interface of a conventional GPRS-136 network is replaced with an IP interface. In this embodiment. an IP interface is placed in parallel with the Gs' interface between the DMS MSC/G-MSC and the GPRS-136 packet-switched network. This interface can handle both signaling and bearer traffic and thereby overcomes the limitations imposed by the current SS7 interface, which can handle only signaling.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use and further object and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 2:
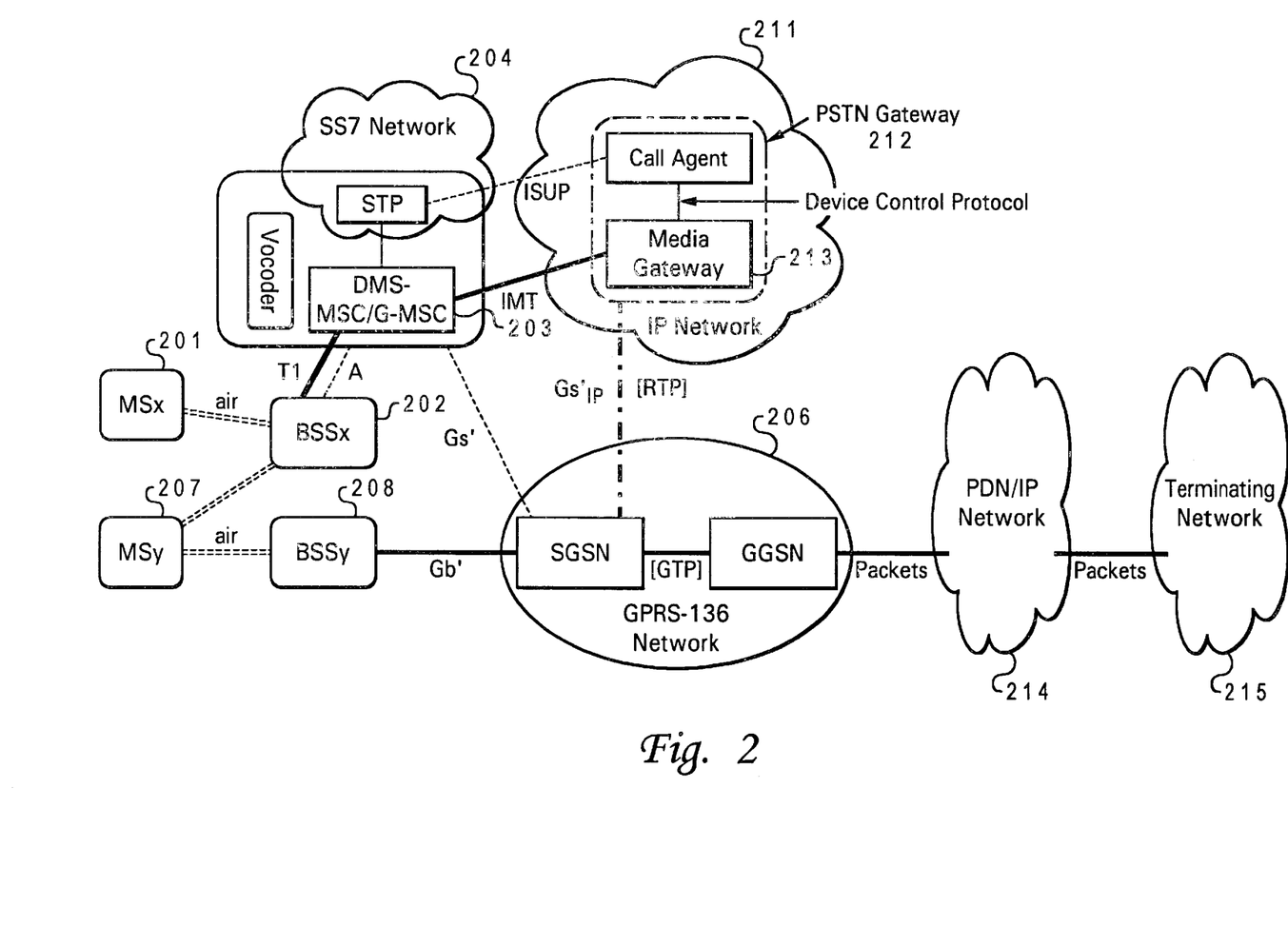
FIG. 2 is an improved GPRS/IP network, in accordance with a preferred embodiment of the invention.

With reference now to the figures, and in particular with reference to FIG. 2, according to the preferred embodiment, the GS' interface of the conventional GPRS-136 network is improved to support bearer data and call control signaling in addition to existing signaling. The improved GS' interface also replaces transport of this interface from SS7 with IP. Further, the preferred embodiment bypasses the vocoder which currently is required by the G-MSC/MSC. It should be noted that where "GPRS-136" is used below, it is intended to apply to the entire GPRS-136 "family", including GPRS, EGPRS, GPRS-136, and GPRS-136HS. Further, those of skill in the art will recognize that the innovative system and techniques described below will also apply to other wireless standards and technologies.

The preferred embodiment is thus a great improvement over the conventional GPRS-136 network shown in FIG. 1, in which the current interface (Gs') between the Gateway MSC (G-MSC) and SGSN node of packet data network is standardized for signaling only and is implemented via SS7.

As shown in FIG. 2, a new functional node, also known as PSTN gateway 212, is defined between the traditional network and the IP network 211. Different interfaces of the PSTN gateway are currently being standardized in IETF (Internet Engineering Task Force), and specific implementations are within the ability of one of ordinary skill in the art. A standard device control protocol can be used between its three functional entities, the Media Gateway, (MG) the Media Gateway Controller (MGC), and Call Agent (CA) or Signaling Gateway (SG). In all figures, CA is assumed to support the functionality of MGC.

According to the preferred embodiment, there is no change in the way voice is handled, from an access point of view, i.e., there are no changes required at BSS or Mobile. Signaling for a voice call is still handled by A interface and bearer is transported using T1 links.

With reference to FIG. 2, voice and circuit-switched data is still supported by the circuit switched network 203/204 and packet-switched data is supported by the GPRS-136 packet data network 206. Gateway MSC (G-MSC) 203 provides a gateway to GPRS-136 network.

In FIG. 2, a mobile station MSx 201, which can incorporate a vocoder and handles voice or circuit-switched data calls, communicates over the air with a BSSx switch 202, which supports voice and/or circuit switched data. The BSSx 202 communicates via both a T1 bearer traffic interface and a signaling interface A with a gateway mobile switching center 203. The SS7 network 204 is connected, in turn, with a GPRS-136 network 206. Note that connection Gs', between the SS7 network 204 and the GPRS-136 network 206, is a signaling interface only.

A GPRS-136 mobile station MSy 207, also incorporating a vocoder and configured to support voice and/or packet-switched data, communicates over the air with a BSSy switch 208, which supports packet data. The BSSy 208 communicates over a bearer traffic interface Gb' with the GPRS-136 network 206. For voice calls, the vocoder of MSy 207 communicates with the BSSx switch 202, as described above.

GPRS-136 network 206 is connected to PDN/IP network 214. The PDN/IP network 214 is connected to terminating network 215.

According to the preferred embodiment, for outgoing calls, the signaling data is sent to Call Agent 212 from SS7 network 204 and bearer data is sent to MG 213 from DMS MSC/G-MSC 203. The MG 213 of this gateway converts media (voice etc.) appropriately. These media packets are sent to SGSN of GPRS-136 network 206 via Gs'ip interface. Within the GPRS-136 network 206, packets are passed to GGSN, and then the packets are passed to PDN/IP network 214 and terminating network 215, as it has been done for data packets in conventional systems.

For incoming calls, all packets are received by the GGSN from the PDN/IP network 214, and then are passed to SGSN via GTP. Until this point, the processing of the packets is as done in a conventional GPRS system as in FIG. 1. In the preferred embodiment, however, instead of just passing this information to BSS, SGSN will distribute packets received and forward non-data related packets to the PSTN gateway 213 via Gs'ip interface. The MG 213 converts these packets and sends information over T1 links to BSS. Similarly, signaling packets from SGSN are received over Gs'ip interface and get converted at Call Agent 212 and sent over the 'A' interface. It should be noted that the conversion of data between the different type of subnetworks may be done by any current method, and is well within the ability of one of ordinary skill in the art.

Note that in both these cases, the vocoder is bypassed. Also, the Terminating Network 215 shown in FIG. 2 can be a Wireless Network, PSTN, or other compatible system.

In these figures, as in FIG. 1, above, where Terminal Specific Signaling is indicated, the following designations apply:

| H.323 | => | H.225 and Q.931 |
|-------|----|----|
| SIP | => | SAP, SIP or RTSP |
| BSSx | => | Supports Voice and/or Circuit-Switched Data |
| BSSy | => | Supports Packet Data |
| MSx | => | A Mobile Station which Supports Voice and/or Circuit-Switched Data |
| MSy | => | A Mobile Station which Supports Packet-Switched Data |

Further, solid lines are used to indicate a bearer traffic interface, dashed lines are used to indicate a signaling interface, and a dot/dash line is used to indicate a new bearer traffic and signaling interface according to the preferred embodiment.

Figure 3:
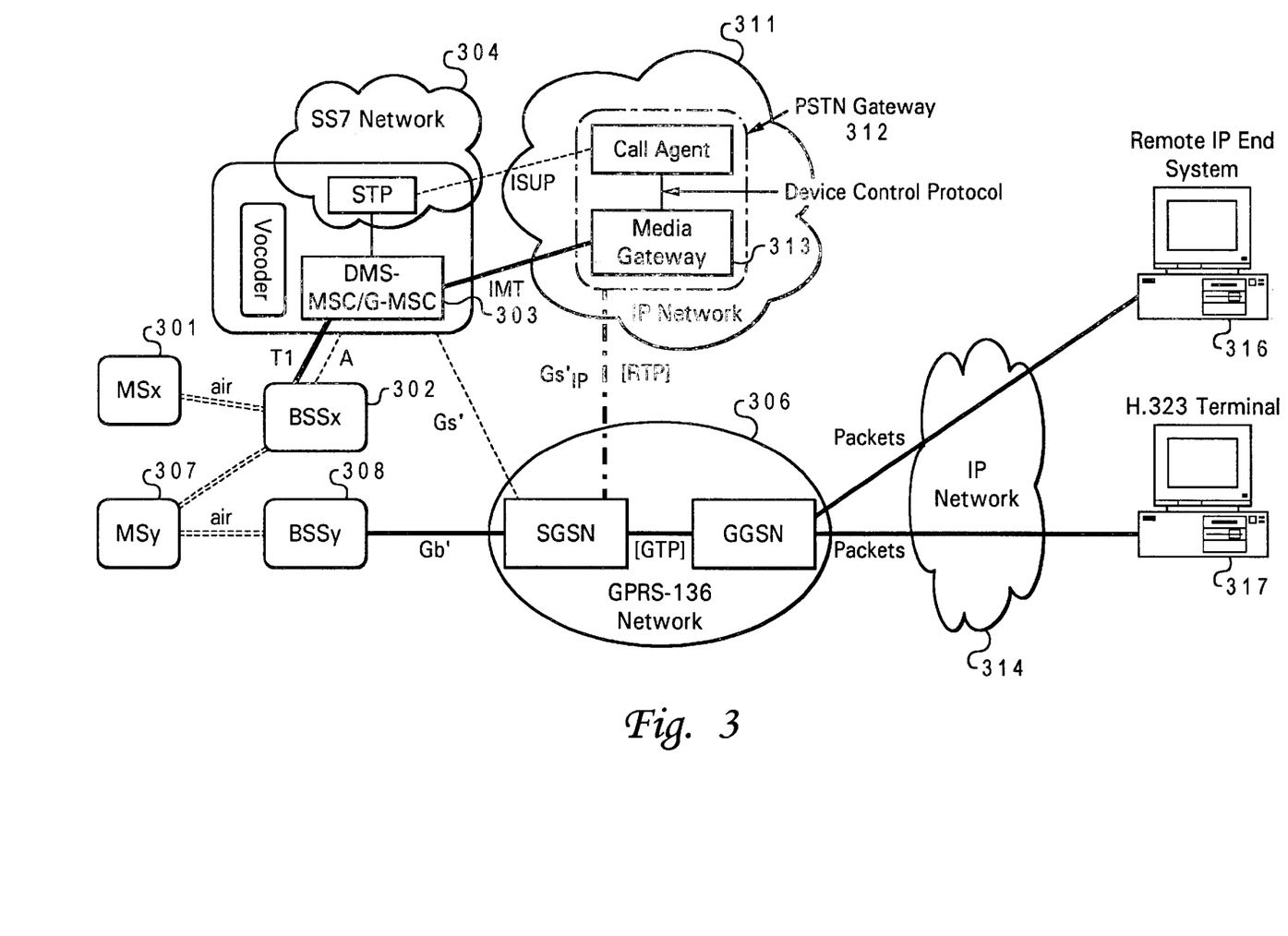
FIG. 3 shows a diagram of the delivery of a telephone call or circuit-switched data transaction originating in an ANSI-136-A voice or circuit-switched data mobile station to an IP network, in accordance with a preferred embodiment of the invention.

FIGS. 3–5 are exemplary illustrations of different transactions made over a system as shown in the preferred embodiment of FIG. 2. FIG. 3 shows a diagram of the delivery of a telephone call or circuit-switched data transaction originating in an ANSI-136-A voice or circuit-switched data mobile station to an IP network or vice versa. Here, the call is routed as described above with relation to FIG. 2, where the IP network 314, instead of passing data to a terminating network (as 214 in FIG. 2), simply routes the data via IP protocol to the remote IP end system 316 and/or to an H.323 terminal 317.

Figure 4:
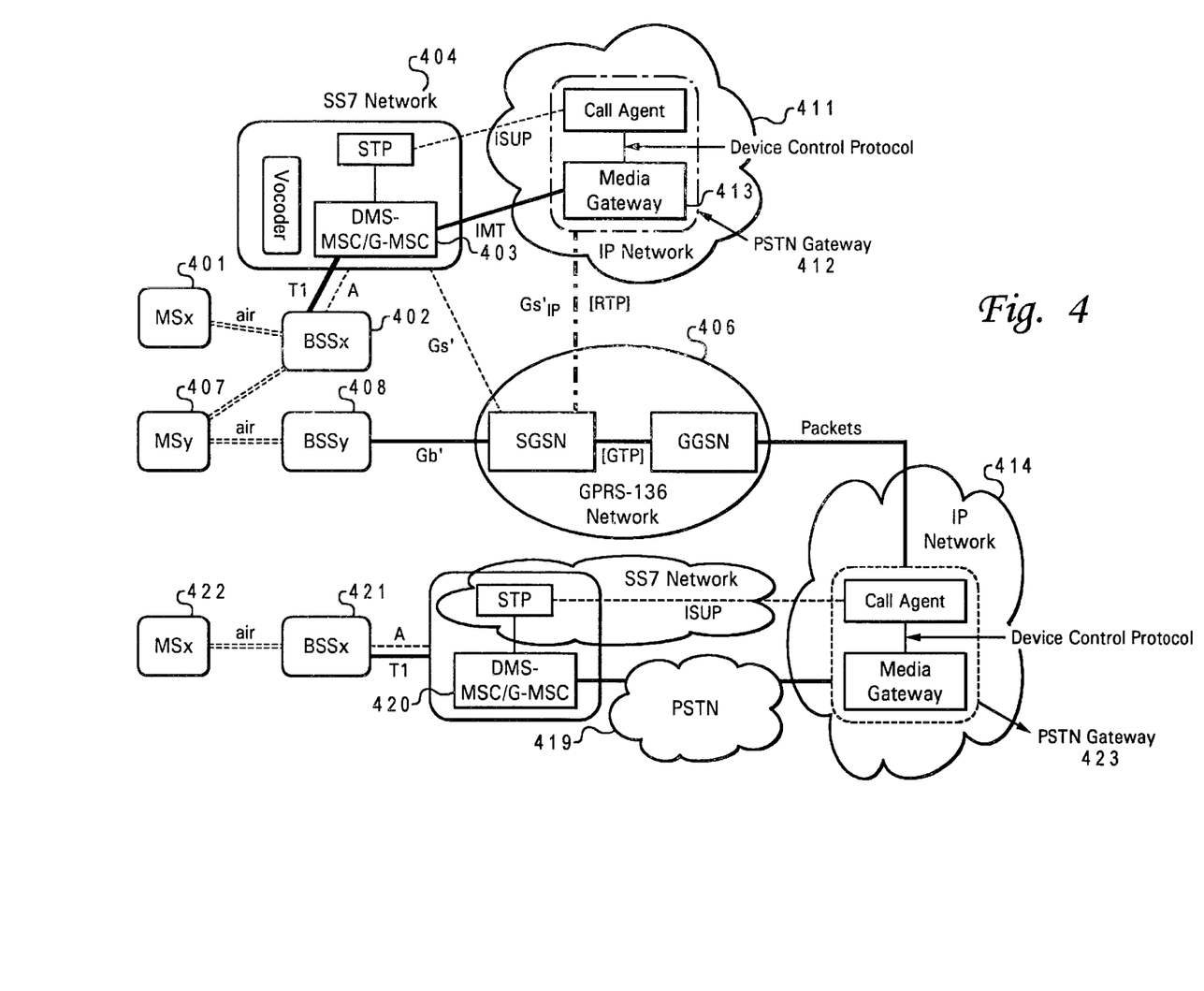
FIG. 4 shows a diagram of the delivery of a telephone call or circuit-switched data transaction originating in an ANSI-136-A voice or circuit-switched data mobile station to another ANSI-136/ANSI-41 network (or vice versa) via an IP network, in accordance with a preferred embodiment of the invention.

FIG. 4 shows a diagram of the delivery of a telephone call or circuit-switched data transaction originating in an ANSI-136-A voice or circuit-switched data mobile station to another ANSI-136/ANSI-41 network (or vice versa) via an IP network. Here, the call is routed as described above with relation to FIG. 2, where the terminating network is an ANSI-136/ANSI-41 network. After the call is routed to PSTN Gateway 423 from the GGSN of GPRS-136 network 406, it is passed over an SS7 network 418/PSTN 419 to the ANSI-136 mobile switching center 420. From here, it is passed over the A interface and T1 to the BSSx 421, and over the air to the ANSI-136 mobile station MSx 422.

Figure 5:
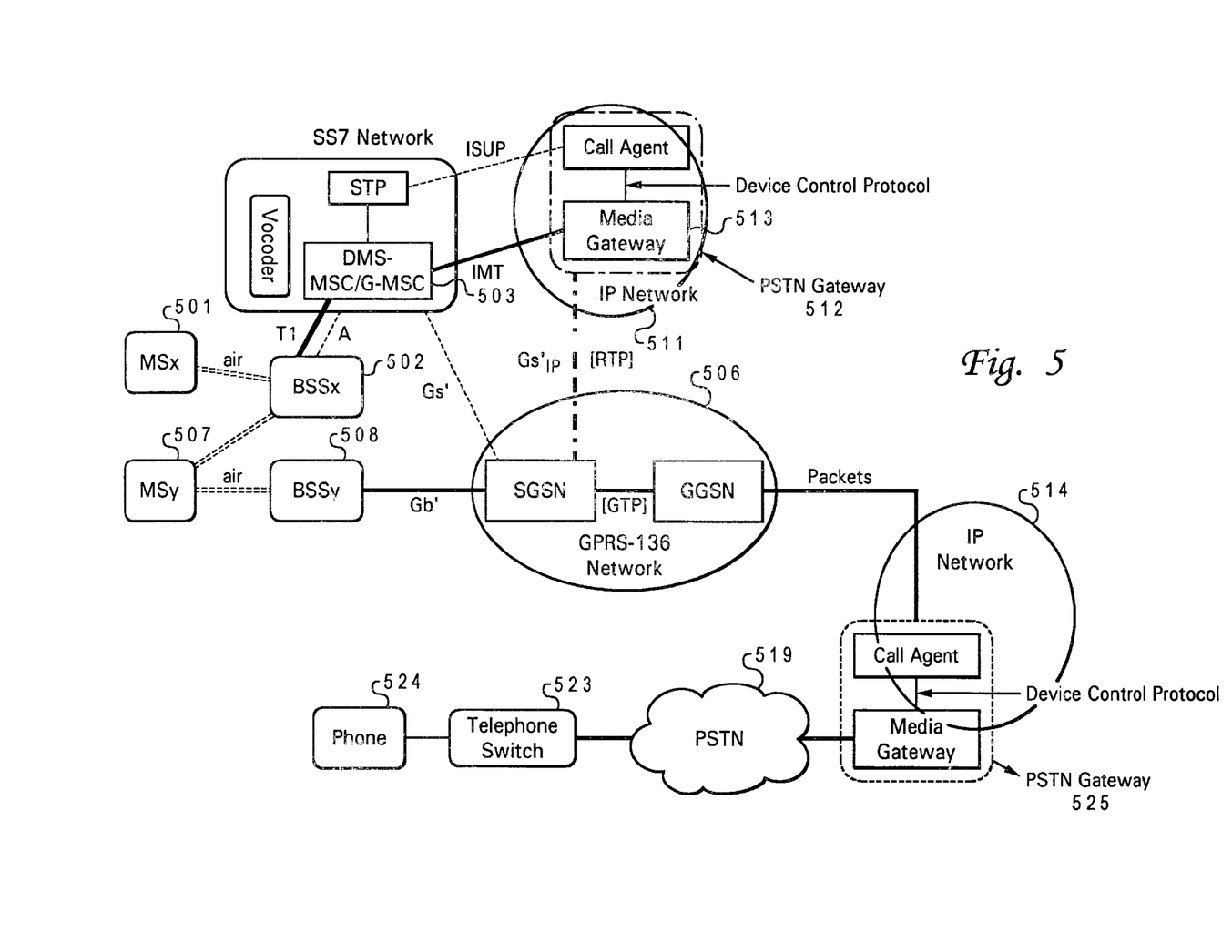
FIG. 5 shows a diagram of the delivery of a telephone call or circuit-switched data transaction originating in an ANSI-136-A voice or circuit-switched data mobile station to a Circuit-Switched Network (SCN) such as PSTN, ISDN via an IP network, in accordance with a preferred embodiment of the invention.

FIG. 5 shows a diagram of the delivery of a telephone call or circuit-switched data transaction originating in an ANSI-136-A voice or circuit-switched data mobile station to a Circuit-Switched Network (SCN) such as PSTN, ISDN via an IP network. Here, the call is routed as described above with relation to FIG. 2, where the terminating network is a PSTN. After the call is routed to PSTN Gateway 525 from the GGSN of the GPRS-136 network 506, it is passed to the PSTN 519, then to a standard POTS switch 523 and telephone 524.

While the invention has been particularly shown and described with reference to a preferred embodiment, it will be understood by those skilled in the art that various changes in form and detail may be made therein without departing from the spirit and scope of the invention.

What is claimed is:

1. A communications network, comprising:
   a circuit-switched communications subnetwork;
   a packet-switched communications subnetwork;
   an Internet Protocol-based communications subnetwork, connected to send and receive data between the circuit-switched subnetwork and the packet-switched subnetwork, said Internet Protocol-based communications subnetwork comprising:
   a call agent receiving signaling data from the circuit-switched communications subnetwork for outgoing calls and receiving signaling packets from packet-switched communications subnetwork for incoming calls;
   a media gateway receiving bearer data from the circuit-switched communications subnetwork for outgoing calls and receiving non-data related packets from the packet-switched communications subnetwork for incoming calls;
   a servicing generalized packet radio service support node receiving packets for incoming calls to the circuit-switched communications subnetwork from a public data network through a gateway generalized packet radio service support node utilizing a generalized packet radio service tunneling protocol, wherein the servicing generalized packet radio service support node routes non-data related packets to the media gateway and routes signaling packets to the call agent;
   wherein a communications path between the circuit-switched communications subnetwork and the packet-switched communications subnetwork is established through the Internet Protocol-based communications subnetwork.

2. The network of claim 1, wherein the circuit-switched communications subnetwork includes an SS7 network.

3. The network of claim 1, wherein the packet-switched communications subnetwork includes at least one of a GPRS-136 network, a GPRS-136HS network, and a EGPRS network.

4. The network of claim 1, wherein:
   the call agent receives signaling data for outgoing calls from the circuit-switched communications subnetwork from an SS7 network connected to the circuit-switched communications subnetwork; and
   the media gateway receives bearer data for outgoing calls from the circuit-switched communications subnetwork from either:
   a digital multiple switch mobile switching center within the circuit-switched communications subnetwork, or
   a gateway mobile switching center within the circuit-switched communications subnetwork.

5. The network of claim 1, further comprising:
   at least one of
   a second Internet Protocol-based communications subnetwork connected to send and receive data from the packet-switched subnetwork,
   a second circuit-switched subnetwork connected to send and receive data from the Internet Protocol-based subnetwork, and
   a public service telephone network connected to send and receive data from the packet-switched subnetwork.

6. The network of claim 1, wherein the circuit-switched subnetwork sends and receives either voice communications or data from a wireless station.

7. A method for communicating between electronic devices, comprising:
   receiving data in a first format from a mobile station in a circuit-switched network, wherein the data includes both signal and bearer traffic for voice and data communications;

converting the data from the first format into a second format in which the data is comprised of multiple data packets, wherein both the signal and bearer traffic are converted to the second format;

sending the data in the second format over an Internet Protocol-based network by:

utilizing an SS7 network to route signaling data for outgoing calls from the circuit-switched network to a calling agent within the Internet Protocol-based network;

utilizing a gateway mobile switching center to route bearer data for outgoing calls from the circuit-switched network to a media gateway within the Internet Protocol-based network; and utilizing an SGSN within a GPRS portion of the packet-switched network to route non-data related packets for incoming calls from the packet-switched network to a media gateway within the Internet Protocol-based network and to route signaling packets for incoming calls from the packet-switched network to a calling agent within the Internet-Protocol-based network.

8. The method of claim 7, further comprising:

a signaling interface between the SS7 network and the SGSN; and a bearer traffic interface between a base station system within the circuit-switched network and the SGSN.

9. The method of claim 7, wherein the step of receiving the data in the second format in a packet-switched network further comprises:

receiving the data in the second format at least one of a GPRS-136 network, a GPRS-136HS network, and a EGPRS network.

10. The method of claim 7, further comprising:

sending the data in the second format to a terminating network, wherein the terminating network includes a second Internet Protocol-based network.

11. The method of claim 7, further comprising:

sending the data in the second format to a terminating network, wherein the terminating network includes a second circuit-switched network.

12. The method of claim 7, further comprising:

sending the data in the second format to a terminating network, wherein the terminating network includes a public service telephone network.

13. The method of claim 7, further comprising:

receiving signaling data in the first format for outgoing calls from the circuit-switched network at a call agent within the Internet Protocol-based network;

receiving signaling packets in the second format for incoming calls to the circuit-switched network at the call agent;

receiving bearer data in the first format for outgoing calls from the circuit-switched network at a media gateway within the Internet Protocol-based network; and receiving non-data related packets in the second format for incoming calls to the circuit-switched network at the media gateway.

14. The method of claim 7, further comprising:

sending and receiving either voice communications or data from the mobile station in the circuit-switched network.

* * * * *

UNITED STATES PATENT AND TRADEMARK OFFICE
CERTIFICATE OF CORRECTION

PATENT NO.    : 6,434,140 B1
DATED         : August 13, 2002
INVENTOR(S)   : Barany et al.

It is certified that error appears in the above-identified patent and that said Letters Patent is hereby corrected as shown below:

Title page,
Item [54], please delete "CIRCUIT/SWITCHED/PACKET-SWITCHED" and please insert -- CIRCUIT-SWITCHED/PACKET-SWITCHED --

Signed and Sealed this

Eleventh Day of February, 2003

JAMES E. ROGAN
*Director of the United States Patent and Trademark Office*